(12) United States Patent
Van Wiemeersch et al.

(10) Patent No.: US 10,301,855 B2
(45) Date of Patent: May 28, 2019

(54) ELECTRONIC CONTROL SYSTEM AND SENSOR FOR ELECTRICALLY POWERED VEHICLE DOOR LATCHES

(71) Applicant: Ford Global Technologies, LLC, Dearborn, MI (US)

(72) Inventors: John Robert Van Wiemeersch, Novi, MI (US); Kosta Papanikolaou, Huntington Woods, MI (US); Robert Bruce Kleve, Ann Arbor, MI (US); Michael Hrecznyj, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/793,670

(22) Filed: Oct. 25, 2017

(65) Prior Publication Data

US 2018/0051498 A1 Feb. 22, 2018

Related U.S. Application Data

(63) Continuation of application No. 14/282,224, filed on May 20, 2014, now Pat. No. 9,834,964, which is a
(Continued)

(51) Int. Cl.
*E05B 81/76* (2014.01)
*B60R 21/00* (2006.01)
(Continued)

(52) U.S. Cl.
CPC ............. *E05B 85/14* (2013.01); *B60R 21/00* (2013.01); *E05B 77/04* (2013.01); *E05B 81/64* (2013.01);
(Continued)

(58) Field of Classification Search
USPC ...................................... 292/336.3
See application file for complete search history.

(56) References Cited

U.S. PATENT DOCUMENTS

| 3,479,767 A | 11/1969 | Gardner et al. |
| 4,457,148 A | 7/1984 | Johansson et al. |

(Continued)

FOREIGN PATENT DOCUMENTS

| CN | 101932466 A | 12/2010 |
| CN | 103206117 A | 7/2013 |

(Continued)

OTHER PUBLICATIONS

Kisteler Instruments, "Force Sensors Ensure Car Door Latch is Within Specification," Article, Jan. 1, 2005, 3 pages.

*Primary Examiner* — Carlos Lugo
(74) *Attorney, Agent, or Firm* — Vichit Chea; Price Heneveld LLP

(57) ABSTRACT

A vehicle door includes a powered latch configured to selectively retain the door in a closed position when the powered latch is latched, and permits the door to be opened when the powered latch is unlatched. The vehicle door further includes an exterior door handle having an outer side that faces away from the door structure, and an inner side that is spaced apart from an outer surface of the door to define a gap. A force sensor on the exterior door handle detects impact forces on the handle. The door also includes an unlatch switch that can be actuated by a user to request unlatching of the powered latch. A controller is configured to deny an unlatch request generated by actuation of the unlatch switch if the force sensor detects an impact on the exterior handle.

6 Claims, 4 Drawing Sheets

Related U.S. Application Data continuation-in-part of application No. 14/281,998, filed on May 20, 2014, now Pat. No. 9,903,142, which is a continuation-in-part of application No. 14/280,035, filed on May 16, 2014, now Pat. No. 10,119,308, which is a continuation-in-part of application No. 14/276,415, filed on May 13, 2014.

(51) Int. Cl.
| | | |
|---|---|---|
| *E05B 85/14* | (2014.01) | |
| *E05B 81/78* | (2014.01) | |
| *E05B 81/64* | (2014.01) | |
| *E05B 77/04* | (2014.01) | |
| *E05B 85/10* | (2014.01) | |

(52) U.S. Cl.
CPC .............. *E05B 81/76* (2013.01); *E05B 81/77* (2013.01); *E05B 81/78* (2013.01); *E05B 85/10* (2013.01); *B60R 2021/0027* (2013.01); *Y10T 292/0945* (2015.04)

(56) References Cited

U.S. PATENT DOCUMENTS

| | | |
|---|---|---|
| 4,672,348 A | 6/1987 | Duve |
| 4,674,781 A | 6/1987 | Reece et al. |
| 4,702,117 A | 10/1987 | Tsutsumi et al. |
| 4,848,031 A | 6/1989 | Yamagishi et al. |
| 4,929,007 A | 5/1990 | Bartczak et al. |
| 5,618,068 A | 4/1997 | Mitsui et al. |
| 5,632,515 A | 5/1997 | Dowling |
| 5,644,869 A | 7/1997 | Buchanan, Jr. |
| 5,653,484 A | 8/1997 | Brackmann et al. |
| 5,802,894 A | 9/1998 | Jahrsetz et al. |
| 5,896,768 A | 4/1999 | Cranick et al. |
| 5,901,991 A | 5/1999 | Hugel et al. |
| 5,921,612 A | 7/1999 | Mizuki et al. |
| 5,992,194 A | 11/1999 | Baukholt et al. |
| 6,000,257 A | 12/1999 | Thomas |
| 6,042,159 A | 3/2000 | Spitzley et al. |
| 6,050,117 A | 4/2000 | Weyerstall |
| 6,065,316 A | 5/2000 | Sato et al. |
| 6,072,403 A | 6/2000 | Iwasaki et al. |
| 6,075,294 A | 6/2000 | Van den Boom et al. |
| 6,099,048 A | 8/2000 | Salmon et al. |
| 6,125,583 A | 10/2000 | Murray et al. |
| 6,241,294 B1 | 6/2001 | Young et al. |
| 6,247,343 B1 | 6/2001 | Weiss et al. |
| 6,256,932 B1 | 7/2001 | Jyawook et al. |
| 6,361,091 B1 | 3/2002 | Weschler |
| 6,441,512 B1 | 8/2002 | Jakel et al. |
| 6,470,719 B1 | 10/2002 | Franz et al. |
| 6,523,376 B2 | 2/2003 | Baukholt et al. |
| 6,550,826 B2 | 4/2003 | Fukushima et al. |
| 6,554,328 B2 | 4/2003 | Cetnar et al. |
| 6,602,077 B2 | 8/2003 | Kasper et al. |
| 6,629,711 B1 | 10/2003 | Gleason et al. |
| 6,639,161 B2 | 10/2003 | Meagher et al. |
| 6,657,537 B1 | 12/2003 | Hauler |
| 6,701,671 B1 | 3/2004 | Fukumoto et al. |
| 6,712,409 B2 | 3/2004 | Monig |
| 6,768,413 B1 | 7/2004 | Kemmann et al. |
| 6,883,839 B2 | 4/2005 | Belmond et al. |
| 7,070,018 B2 | 7/2006 | Kachouh |
| 7,070,213 B2 | 7/2006 | Willats et al. |
| 7,091,823 B2 | 8/2006 | Ieda et al. |
| 7,091,836 B2 | 8/2006 | Kachouh et al. |
| 7,097,226 B2 | 8/2006 | Bingle et al. |
| 7,126,453 B2 | 10/2006 | Sandau et al. |
| 7,173,346 B2 | 2/2007 | Aiyama et al. |
| 7,192,076 B2 | 3/2007 | Ottino |
| 7,221,255 B2 | 5/2007 | Johnson et al. |
| 7,222,459 B2 | 5/2007 | Taniyama |
| 7,325,843 B2 | 2/2008 | Coleman et al. |
| 7,375,299 B1 | 5/2008 | Pudney |
| 7,399,010 B2 | 7/2008 | Hunt et al. |
| 7,931,314 B2 | 4/2011 | Nitawaki et al. |
| 7,937,893 B2 | 5/2011 | Pribisic |
| 8,141,916 B2 | 3/2012 | Tomaszewski et al. |
| 8,376,416 B2 | 2/2013 | Arabia, Jr. et al. |
| 8,451,087 B2 | 5/2013 | Krishnan et al. |
| 8,474,889 B2 | 7/2013 | Reifenberg et al. |
| 8,544,901 B2 | 10/2013 | Krishnan et al. |
| 8,573,657 B2 | 11/2013 | Papanikolaou et al. |
| 8,746,755 B2 | 6/2014 | Papanikolaou et al. |
| 9,416,565 B2 | 8/2016 | Papanikolaou et al. |
| 2001/0005078 A1 | 6/2001 | Fukushima et al. |
| 2003/0009855 A1 | 1/2003 | Budzynski |
| 2003/0101781 A1 | 6/2003 | Budzynski et al. |
| 2003/0107473 A1 | 6/2003 | Pang et al. |
| 2004/0195845 A1 | 10/2004 | Chevalier |
| 2004/0217601 A1 | 11/2004 | Garnault et al. |
| 2007/0001467 A1 | 1/2007 | Muller et al. |
| 2007/0115191 A1 | 5/2007 | Hashiguchi et al. |
| 2007/0126243 A1 | 6/2007 | Papanikolaou et al. |
| 2007/0170727 A1 | 7/2007 | Kohlstrand et al. |
| 2008/0068129 A1 | 3/2008 | Ieda et al. |
| 2008/0203737 A1 | 8/2008 | Tomaszewski et al. |
| 2008/0217956 A1 | 9/2008 | Gschweng et al. |
| 2008/0224482 A1 | 9/2008 | Cumbo et al. |
| 2008/0250718 A1 | 10/2008 | Papanikolaou et al. |
| 2009/0033104 A1 | 2/2009 | Konchan et al. |
| 2009/0160211 A1 | 6/2009 | Kirshnan et al. |
| 2010/0052337 A1 | 3/2010 | Arabia, Jr. et al. |
| 2010/0175945 A1 | 7/2010 | Helms |
| 2011/0154740 A1 | 6/2011 | Matsumoto et al. |
| 2011/0227351 A1 | 9/2011 | Grosedemouge |
| 2012/0205925 A1 | 8/2012 | Muller et al. |
| 2013/0079984 A1 | 3/2013 | Aerts et al. |
| 2013/0104459 A1 | 5/2013 | Patel et al. |
| 2014/0007404 A1 | 1/2014 | Krishnan et al. |
| 2015/0330112 A1 | 11/2015 | Van Wiemeersch et al. |
| 2015/0330113 A1 | 11/2015 | Van Wiemeersch et al. |
| 2015/0330114 A1 | 11/2015 | Linden et al. |

FOREIGN PATENT DOCUMENTS

| | | |
|---|---|---|
| CN | 103264667 A | 8/2013 |
| DE | 19642698 A1 | 4/1998 |
| DE | 20121915 U1 | 11/2003 |
| DE | 102006029774 A1 | 1/2008 |
| DE | 102011051165 A1 | 12/2012 |
| DE | 102015101164 A1 | 7/2015 |
| DE | 102014107809 A1 | 12/2015 |
| EP | 1162332 A1 | 12/2001 |
| EP | 1284334 A1 | 9/2003 |
| EP | 1460204 A2 | 9/2004 |
| EP | 1465119 A1 | 10/2004 |
| EP | 1338731 A3 | 2/2005 |
| EP | 2053744 A2 | 4/2009 |
| EP | 2314803 A2 | 4/2011 |
| FR | 2955604 A1 | 7/2011 |
| JP | 62255256 A | 11/1987 |
| JP | 05059855 A | 3/1993 |
| KR | 20120108580 A | 10/2012 |
| WO | 2013111615 A1 | 8/2013 |
| WO | 2013146918 A1 | 10/2013 |

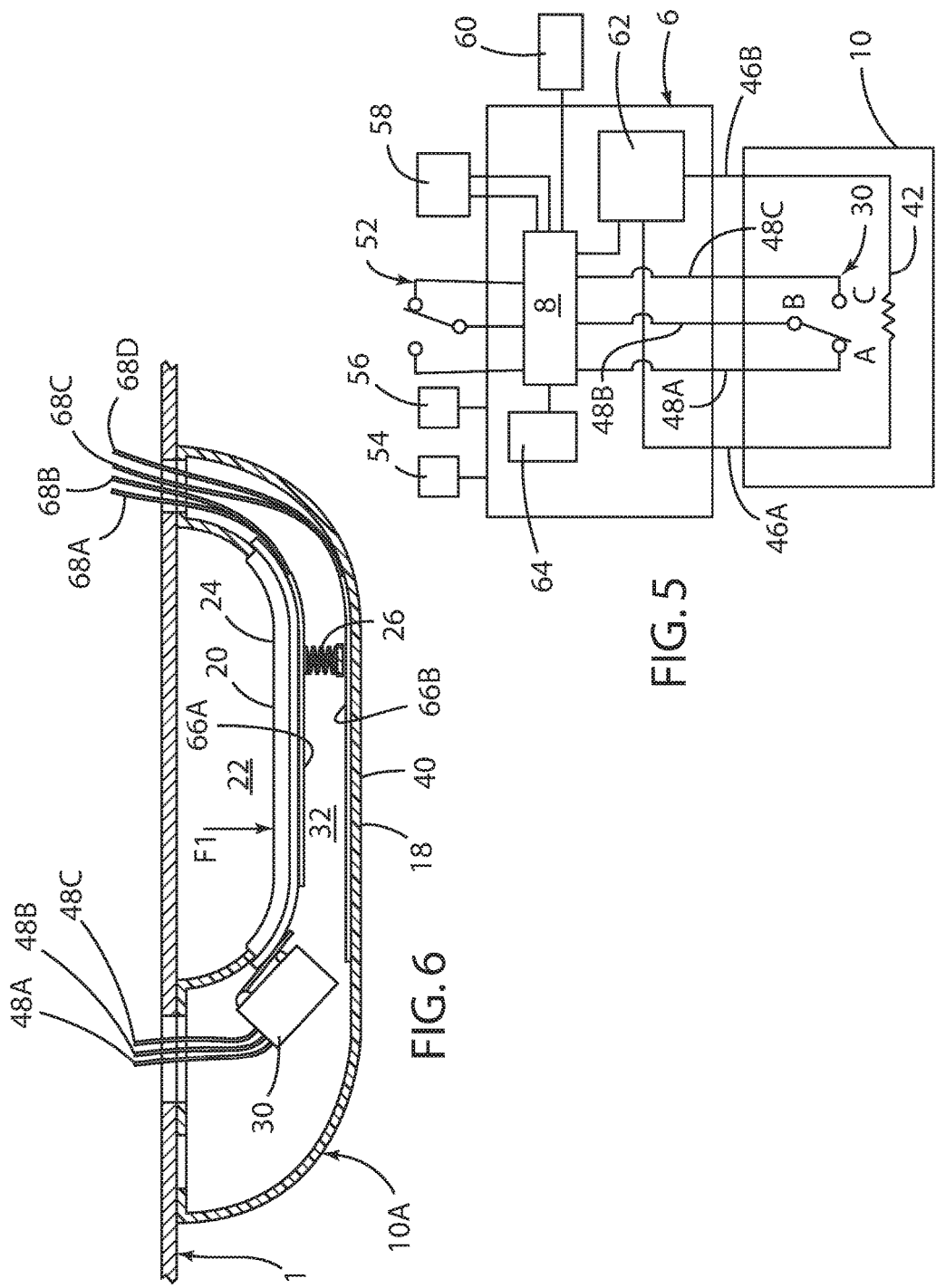

ELECTRONIC CONTROL SYSTEM AND SENSOR FOR ELECTRICALLY POWERED VEHICLE DOOR LATCHES

CROSS-REFERENCE TO RELATED APPLICATIONS

This application is a continuation of U.S. patent application Ser. No. 14/282,224, filed on May 20, 2014, and entitled "POWERED VEHICLE DOOR LATCH AND EXTERIOR HANDLE WITH SENSOR," now U.S. Pat. No. 9,834,964, issued on Dec. 5, 2017, which is a Continuation-in-Part U.S. patent application Ser. No. 14/281,998, filed on May 20, 2014, entitled "VEHICLE DOOR HANDLE AND POWERED LATCH SYSTEM," now U.S. Pat. No. 9,903,142 issued on Feb 27, 2018, which is a Continuation-in-Part of U.S. patent application Ser. No. 14/280,035 which was filed on May 16, 2014, entitled "POWERED LATCH SYSTEM FOR VEHICLE DOORS AND CONTROL SYSTEM THEREFOR," now U.S. Pat. No. 10,119,308, issued on Nov. 6, 2018, which is a Continuation-in-Part of U.S. patent application Ser. No. 14/276,415, entitled "CUSTOMER COACHING METHOD FOR LOCATION OF E-LATCH BACKUP HANDLES." The entire disclosures of all of the above-identified patent applications are incorporated herein by reference.

FIELD OF THE INVENTION

The present invention generally relates to doors for motor vehicles, and more particularly, to an exterior door handle having sensors and/or switches that may be utilized to control operation of a powered door latch.

BACKGROUND OF THE INVENTION

Conventional vehicle door latches may include a movable "claw" that engages a striker to retain the door in a closed position when the latch is in a latched condition. A pawl selectively prevents movement of the claw from an engaged position to prevent the vehicle door from opening. The pawl may be mechanically connected to interior and/or exterior door handles whereby movement of the handles unlatches the latch by shifting the pawl to a released (unlatched) position, thereby permitting the claw to move and disengage from the striker.

Powered door latches ("e-latches") have also been developed. Powered door latches may be unlatched by actuating an electrical "unlatch" switch. Actuation of the unlatch switch causes an electric motor to shift a pawl of the powered latch mechanism to a released (unlatched) position that allows the claw to move and disengage from a striker. However, known e-latch arrangements may suffer from various drawbacks such as unintentional or accidental trigger of the release switch causing the door to unlatch.

SUMMARY OF THE INVENTION

One aspect of the present invention is a vehicle door including a door structure having an outside handle and a powered latch that is configured to selectively retain the door in a closed position when the powered latch is latched. The powered latch permits the door to open when the powered latch is unlatched. The vehicle door further includes an exterior door handle having an outer side. A variable resistance bend sensor extends along the outer side of the exterior door handle such that an impact force applied to the outer side of the handle changes an electrical resistance of the bend sensor. The vehicle door further includes an unlatch switch disposed on the outside of the door structure. Actuation of the unlatch switch does not cause the powered latch to unlatch if a change in electrical resistance of the bend sensor is sufficient to signal a side impact has occurred, or may be in progress, within a predefined time interval preceding actuation of the unlatch switch.

Another aspect of the present invention is a powered door latch system including an electrically powered latch and an exterior door handle including an unlatch switch and an elongated bend sensor having an electrical resistance that increases if the sensor bends. A controller unlatches the powered latch upon actuation of the unlatch switch unless an increase in resistance exceeding a predefined amount indicative of a side impact has occurred within a predefined time interval of switch actuation.

Yet another aspect of the present invention is a vehicle door including a door structure having an outside and a powered latch configured to selectively retain the door in a closed position when the powered latch is latched. The powered latch permits the door to open when the powered latch is unlatched. The vehicle door further includes an exterior door handle having an outer side that faces away from the door structure, and an inner side that is spaced apart from the door structure to define a gap. The vehicle door further includes a capacitive sensor on the exterior door handle capable of detecting a user's hand disposed in the gap. An unlatch switch is disposed on the outside of the door structure. The vehicle door includes a controller configured to unlatch the powered latch if the unlatch switch is actuated at the same time as the capacitive sensor detects a user's hand.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5 is a diagram showing the electrical components of the door handle of FIG. 1; and FIG. 6 is a cross sectional view of an exterior door handle according to another aspect of the present invention.

DETAILED DESCRIPTION OF THE PREFERRED EMBODIMENTS

Figure 1:
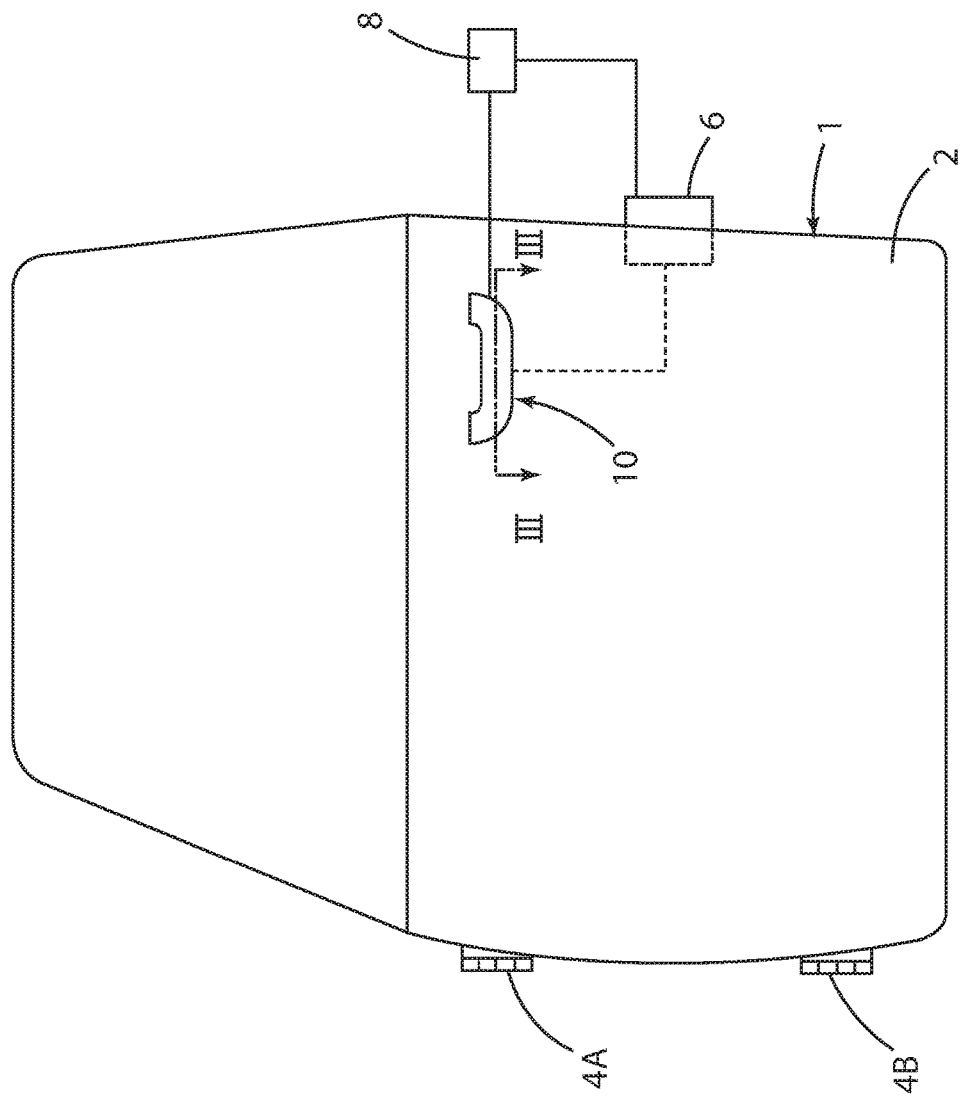
FIG. 1 is a partially schematic view of a vehicle door including a powered latch and exterior handle according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a vehicle door 1 according to one aspect of the present invention includes a vehicle door structure 2 that may be movably mounted to a vehicle in a known manner utilizing hinges 4A and 4B. As discussed in more detail below, the door 1 also includes a powered latch 6 that selectively retains the door 1 in a closed position when the powered latch 6 is latched. Powered latch 6 permits the vehicle door 1 to be opened when the powered latch 6 is unlatched. The powered latch 6 may be operably connected to a controller 8 and/or the controller 8 may be integrated into the powered latch 6. As discussed in more detail below, the controller 8 may be operably interconnected to one or more controllers or systems that are utilized by a motor vehicle to control various electronic components and systems throughout the vehicle. The vehicle door 1 also includes an exterior door handle 10 that is operably connected to the powered latch 6 and controller 8.

Figure 2:
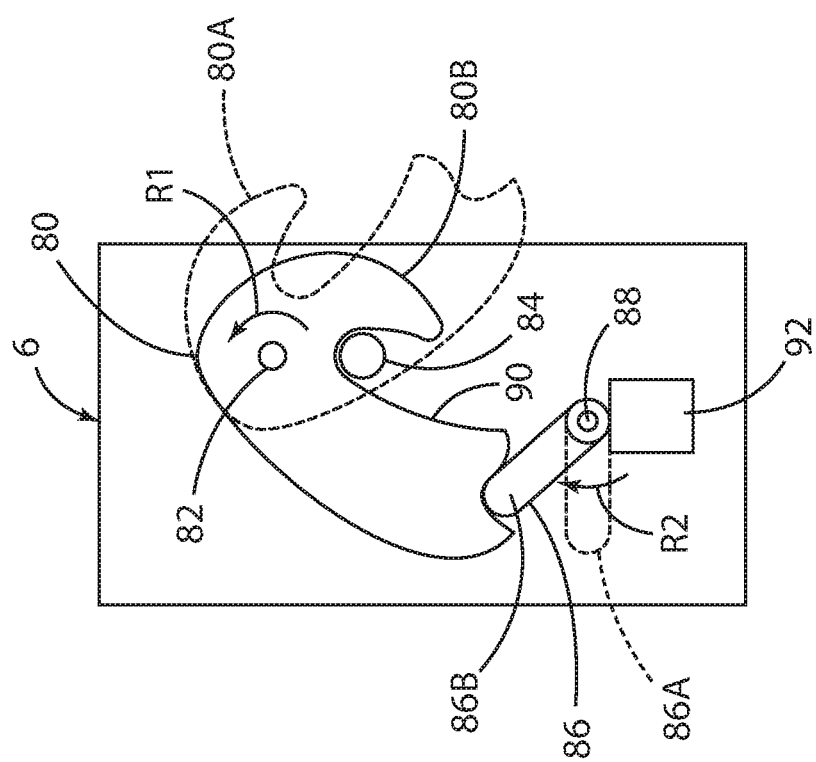
FIG. 2 is a partially schematic view of the powered latch of FIG. 1.

With further reference to FIG. 2, powered latch 6 may include a claw 80 that pivots about a pin 82. In use, when door 1 is open, claw 80 will typically be in an extended position 80A. As the door 1 is closed, surface 90 of claw 80 comes into contact with a striker 84 that is mounted to the vehicle structure. Contact between striker 84 and surface 90 of claw 80 causes the claw 80 to rotate about pin 82 in the direction of the arrow "R1" until the claw 80 reaches the closed position 80B. A pawl 86 is rotatably mounted for rotation about a pin 88. Pawl 86 can move between a disengaged or unlatched position 86A and a latched or engaged configuration or position 86B. When claw 80 is in the closed position 80B, and pawl 86 is in the engaged position 86B, pawl 86 prevents rotation of claw 80 to the open position 80A, thereby preventing opening of door 1. Claw 80 may be biased by a spring or the like for rotation in a direction opposite the arrow R1 such that the claw 80 rotates to the open position 80A unless pawl 86 is in the engaged position 86B. Pawl 86 may be biased by a spring or the like in the direction of the arrow R2 such that pawl 86 rotates to the engaged position 86B as claw 80 rotates to the closed position 80B as striker 84 engages claw 80 as door 1 is closed. Latch 6 can be unlatched by rotating pawl 86 in a direction opposite the arrow R2 to thereby permit rotation of claw 80 from the closed position 80B to the open position 80A. A powered actuator such as an electric motor 92 may be operably connected to the pawl 86 to thereby rotate the pawl 86 to the disengaged or unlatched position 86A. Thus, in general, controller 8 can cause powered latch 6 to shift from a latched configuration or state to an unlatched configuration or state by causing powered actuator 92 to rotate pawl 86 from the latched or engaged position 86B to the unlatched configuration or position 86A. However, it will be understood that various types of powered latches may be utilized in the present invention, and the powered latch 6 need not include the claw 80 and powered pawl 86 as shown in FIG. 2. For example, powered actuator 92 could be operably interconnected with the claw 80 utilizing a mechanical device other than pawl 86 to thereby shift the powered latch 6 between latched and unlatched states. In general, vehicle door 1 can be pulled open if powered latch 6 is in an unlatched state, but the powered latch 6 retains the vehicle door 1 in a closed position when the powered latch 6 is in a latched state or configuration. Controller 8 may be configured to store a "locked" or "unlocked" state of latch 6.

In general, controller 8 will not unlatch powered latch 6 unless the controller 8 has a record of an unlock state in memory for the subject door.

Figure 3:
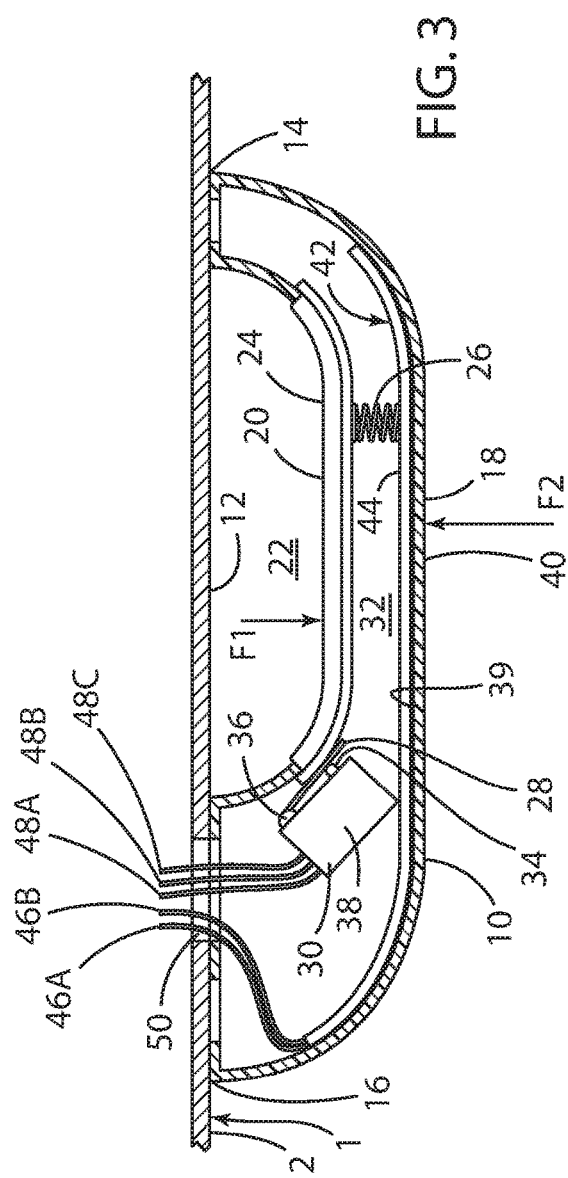
FIG. 3 is a cross sectional view of the door handle of FIG. 1 taken along the line III-III.

With further reference to FIG. 3, exterior door handle 10 may include first and second ends 14 and 16, respectively that are secured to the door structure 2. The door handle 10 may have a generally tubular construction with an outer side 18 that faces away from an exterior surface 12 of door structure 2, and an inner side 20 that generally faces the exterior surface 12 of door 1. The inner side 20 of handle 10 is spaced apart from exterior surface 12 of door 1 to define a gap 22. The gap 22 is sufficiently large to permit a user to insert at least a portion of his or her hand into the gap 22, thereby enabling a user to generate a force F1 acting on inner side 20 of door handle 10 whereby the user can pull the vehicle door 1 open when powered latch 6 is unlatched. Handle 10 may have a variety of configurations and the present invention is not limited to the specific configuration shown in FIG. 3.

Door handle 10 also includes a movable member 24 disposed on inner side 20 of handle 10. The movable member 24 may be biased towards the surface 12 of door 1 by a spring 26 and/or a movable switch member 28 of an unlatch switch 30 that is disposed within interior space 32 of handle 10. As discussed in more detail below, unlatch switch 30 comprises a three wire two pole switch having conductive elements 48A, 48B, and 48C that operably connect the unlatch switch 30 to controller 8. The conductive elements 46A, 46B, 48A, 48B, and 48C may comprise electrical lines or the like that may be routed through one or more openings 50 in door handle 10 and door structure 2. Movable switch member 28 may comprise a lever that is rotatably mounted about a pivot 36 to switch body 38 whereby movement of switch member 28 causes plunger or actuating member 34 to be shifted inwardly to thereby actuate the unlatch switch 30. In use, a user grasps handle 10 and applies a force "F1" to the movable member 24, thereby overcoming the bias of spring 26 and movable switch member 28 of unlatch switch 30, thereby causing switch member 28 to shift plunger 34 inwardly to actuate unlatch switch 30.

Figure 4:
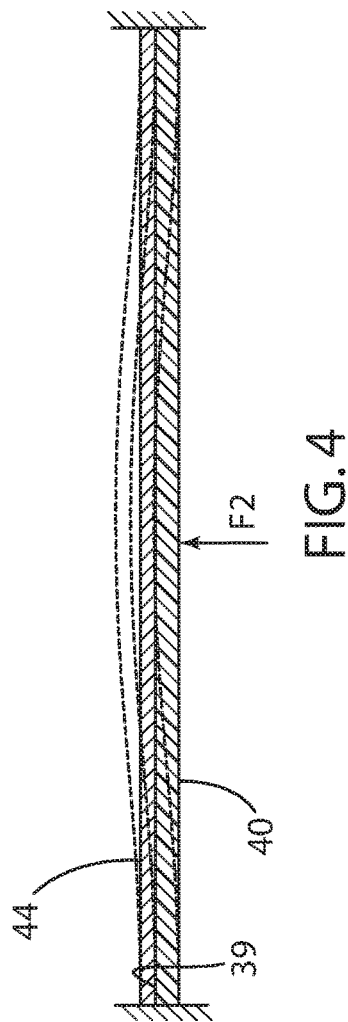
FIG. 4 is a schematic view of a portion of the exterior door handle of FIG. 3.

Handle 10 also includes an elongated bend sensor 42 extending along an inside surface 39 of an outer sidewall 40 of handle 10. The elongated bend sensor 42 includes an elongated sensing member 44 that provides electrical resistance across conductive elements 46A and 46B. In general, an impact force "F2" on outer sidewall 40 (see also FIG. 4) will cause the sidewall 40 to be deflected inwardly, thereby bending the elongated sensing element 44 of bend sensor 42. Bending of the sensing element 44 changes the electrical resistance across the conductors 46A and 46B, such that the force F2 can be detected by controller 8 due to the change in resistance. In a preferred embodiment, bending of elongated sensing element 44 causes an increase in resistance across the conductive elements 46A and 46B. The elongated bend sensor 42 may comprise a sensor of the type available from Flexpoint Sensor Systems, Inc. of Draper, Utah. Bend sensor 42 may be secured to sidewall 40 by adhesives, threaded fasteners, or other suitable techniques.

The outer sidewall 40 of handle 10 may comprise a metal or polymer material (e.g. metal plated polymer) that deforms if an impact force F2 is applied to the door handle 10 during a side impact or other such event. Outer sidewall 40 may be somewhat flexible such that water pressure acting on outer sidewall 40 flexes outer sidewall 40 and elongated sensing element 44 if the handle 10 is submerged in water. The elongated bend sensor 42 may also be capable of detecting an underwater condition if the vehicle and door handle were to be submerged under water. Door handle 10 may have a watertight construction, such that the interior space 32 does not fill with water even if the handle 10 is submerged in water.

With further reference to FIG. 5, unlatch switch 30 and bend sensor 42 are operably connected to controller 8 of powered latch 6. The controller 8 may be operably connected to an interior unlatch switch 52, interior unlock switch 54 and a main vehicle power supply 56. The interior unlatch switch 52 and interior unlock switch 54 may operate in the manner described in co-pending U.S. patent application Ser. No. 14/281,998, entitled "VEHICLE DOOR HANDLE AND POWERED LATCH SYSTEM", filed on May 20, 2014, now U.S. Pat. No. 9,903,142, issued on Feb. 27, 2018, the entire contents of which are incorporated by reference. Controller 8 may also be operably connected to a body control module 58 and a vehicle data system 60. The vehicle data system 60 may include a number of sensors and systems including a Restraints Control Module (RCM) having lateral acceleration sensors and/or other sensors that are utilized by the RCM to detect a crash event requiring deployment of emergency constraints (e.g. airbags). Vehicle data system 60 may include additional components such as an antilock brake system or module (ABS) that provide additional data (e.g. vehicle speed) to body control module 58 and/or controller 8. Body control module 58 and/or controller 8 may be configured (e.g. programmed) to prevent unlatching of powered latch 6 according to various criteria/control logic. For example, controllers 8 and/or 58 may be configured to inhibit unlatching of powered latch 6 if the vehicle speed is above a predefined speed (e.g. 3 kph), and require additional inputs such as actuation of interior switch 52 twice within a predefined time interval (e.g. 3 seconds). A vehicle according to the present invention may include one or more doors a (e.g. 2 or 4 doors), each having powered latches 6 and exterior handles 10. Also, the handle 10 with bend sensor 42 may be utilized in connection with rear hatches, sliding doors, and other moving panels of the type that utilize powered latches.

The powered latch 6 may also include an emergency electrical power supply 64 that is operably connected to the controller 8 and the powered actuator 92 (FIG. 2) to thereby permit operation of controller 8 and powered actuator 92 in the event that the local door power supply or main vehicle power supply 56 is lost. Emergency electrical power supply 64 may comprise capacitors, batteries, or other suitable electrical components.

Bend sensor 42 may operate at low voltages. Accordingly, the system may include an amplifier circuit 62 that is operably connected to the bend sensor 42 by conductive elements 46A and 46B. Amplifier circuit 62 provides an amplified signal to controller 8.

In operation, controller 8 monitors the bend sensor 42, and checks and records the voltage gain of the bend sensor 42 periodically (e.g. every 8 seconds) when the switch 30 has not been actuated (i.e. contacts A and B connect conductive elements 48A and 48B). Controller 8 can thereby establish a baseline voltage (and resistance) for bend sensor 42 that is continuously updated to account for changes in voltage due to changes in temperature or other operating conditions. A user can generate an unlatch request by actuating the unlatch switch 30, thereby interconnecting contacts B and C. Actuation of switch 30 causes voltage transition that is detected by controller 8 by looking for an edge transition of the signal. When the controller 8 detects actuation of unlatch switch 30, the controller 8 executes a de-bounce of contacts A-B and B-C to validate the transition. For example, controller 8 could be configured to require 34-56 valid counts. After actuation of switch 30, controller 8 simultaneously samples the voltage of bend sensor 42 across conductors 46A and 46B on each count (e.g. 34-56) to determine if there has been a significant change in resistance of bend sensor 42 due to an impact force F2 (FIG. 3). If controller 8 determines that an impact event has occurred due to a significant change in resistance of bend sensor 42, controller 8 denies the unlatch request and does not unlatch the powered latch 6. Conversely, if a user actuates the unlatch switch 30 and the change in resistance of bend sensor 42 remains in a range that is below the amount of change required to indicate an impact event has occurred, the controller 8 will unlatch powered latch 6 (provided the powered latch 6 is not in a locked state or other inhibits are not in effect such as a speed lockout). If the controller 8 determines that the powered latch 6 is in a locked state, actuation of unlatch switch 30 will not result in unlatching of powered latch 6 even if bend sensor 42 does not detect an impact force on exterior door handle 10.

The bend sensor 42 and unlatch switch 30 described above provide significant advantages. Specifically, controller 8 will not unlatch powered latch 6 unless unlatch switch 30 is actuated and no impact force is detected. Because two input conditions or parameters must be satisfied to unlatch powered latch 6, unwanted unlatching that could otherwise occur is eliminated. For example, in the event the conductive elements 46A and/or 46B are shorted to the vehicle ground during an impact, this grounding will not result in controller 8 unlatching powered latch 6 because this grounding would not cause actuation of unlatch switch 30. Also, controller 8 may be configured to avoid false detection of an impact if one or both of conductors 46A and 46B are broken (i.e. opened). This type of failure would result in "infinite" resistance between conductors 46A and 46B, and controller 8 can be configured to construe resistances above a predefined value as corresponding to a failure of bend sensor 42 rather than an impact. Still further, if conductive elements 46A and 46B are shorted together due to mechanical damage or other failure, controller 8 will not construe this to be an impact event because this type of failure would not result in an increase in resistance across bend sensor 42 in combination with actuation of switch 30. Still further, because the powered latch 6 includes its own emergency power supply 64, even if the local or main vehicle battery fails or is otherwise lost, this will not affect operation of the powered latch 6.

With further reference to FIG. 6, an exterior door handle 10A according to another aspect of the present invention may include a movable member 24 that is operably connected to an unlatch switch 30 in substantially the same manner as described in more detail above in connection with FIG. 3. However, in contrast to the door handle 10 of FIG. 1-5, the exterior door handle 10A does not include a bend sensor. Rather, handle 10A includes a first capacitive sensor 66A disposed on the inner side 20 of handle 10A and a second capacitive sensor 66B on outer side 18 of handle 10A. The capacitive sensors 66A and 66B are configured to detect the presence of a user's hand when the user grasps handle 10A in substantially the same manner as the capacitive sensors mounted to the interior door handle of above-identified co-pending U.S. Pat. No. 9,903,142, entitled "VEHICLE DOOR HANDLE AND POWERED LATCH SYSTEM". Capacitive sensors 66A and 66B may be operably connected to the controller 8 (FIG. 5) by conductive elements 68A, 68B, 68C, and 68D, respectively. In use, controller 8 is configured to unlatch powered latch 6 only if a user's hand is detected by capacitive sensors 66A and 66B coincident with actuation of switch 30 and the presence of a user's hand is detected by capacitive sensors 66A and 66B for the entire period of time that the unlatch switch 30 is actuated. The controller 8 may be configured to check the capacitive sensors 66A and 66B periodically (e.g. every 8 seconds) to establish a baseline capacitance. If the capacitance drifts or otherwise changes slowly due to snow, water, ice, changing temperature, or the like, the baseline for capacitive sensor 66 is adjusted. If the controller 8 detects that the unlatch switch 30 has been actuated, the controller 8 may be configured to de-bounce the switch 30 by waiting for 34-56 ms for a persistent valid reading of the switch in the closed state. The controller 8 would also read the signal from capacitive sensors 66A and 66B for each of the samples during the same 35-56 ms de-bounce. If the capacitance detected during the closure of switch 30 is consistent with that of a user's hand, the controller 8 then unlatches the powered latch 6. However, if the capacitance detected during this time interval is not consistent with a hand (or gloved hand) during the time in which the switch 30 is closed, the controller 8 would then deny the unlatch request.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An electronic control system for a vehicle door having an electrically powered latch and an exterior door handle, the electronic control system comprising:
   a variable resistance bend sensor configured to extend along an exterior door handle adjacent an outer sidewall of the door handle such that a side impact force applied to the outer sidewall of the handle changes an electrical resistance of the bend sensor;
   an unlatch switch; and
   a controller configured to independently monitor the bend sensor and the unlatch switch, and wherein the controller is configured to monitor both the bend sensor and the unlatch switch and wherein the controller is also configured to unlatch the powered latch if the unlatch switch is actuated and if a change in resistance of the bend sensor remains in a range that is below an amount of change required to indicate that a side impact event has occurred, and wherein the controller is further configured such that, if the change in resistance of the bend sensor is above an amount of change required to indicate that a side impact event has occurred, the controller will not unlatch the powered latch even if the unlatch switch is actuated.

2. The electronic control system of claim 1, wherein:
   the bend sensor is configured such that bending of the sensor due to a side impact on the handle causes an increase in the electrical resistance of the bend sensor.

3. The electronic control system of claim 1, wherein:
   the bend sensor includes an elongated sensor member that is configured to be positioned on an inner side of an outer side wall of an exterior door handle.

4. The electronic control system of claim 1, wherein:
   the unlatch switch includes first, second, and third conductors, and wherein the second conductor that is connected to the first conductor when the unlatch switch is not actuated, and wherein the second conductor is connected to a third conductor when the unlatch switch is actuated.

5. The electronic control system of claim 4, wherein:
   the controller is configured to detect an edge transition in an electrical signal from the unlatch switch upon connecting the second conductor to the third conductor.

6. An electronic control system for a vehicle door having an electrically powered latch and an exterior door handle, the electronic control system comprising:
   a variable resistance bend sensor configured to extend adjacent an outer side of an exterior door handle such that a side impact force applied to the outer side of the handle changes an electrical resistance of the bend sensor;
   an unlatch switch;
   a controller configured to independently monitor the bend sensor and the unlatch switch, and wherein the controller is configured to monitor both the bend sensor and the unlatch switch and wherein the controller is also configured to unlatch the powered latch if the unlatch switch is actuated and if a change in resistance of the bend sensor remains in a range that is below an amount of change required to indicate that a side impact event has occurred, and wherein the controller is further configured such that, if the change in resistance of the bend sensor is above an amount of change required to indicate that a side impact event has occurred, the controller will not unlatch the powered latch even if the unlatch switch is actuated;
   wherein the unlatch switch includes first, second, and third conductors, and wherein the second conductor that is connected to the first conductor when the unlatch switch is not actuated, and wherein the second conductor is connected to a third conductor when the unlatch switch is actuated;
   wherein the controller is configured to detect an edge transition in an electrical signal from the unlatch switch upon connecting the second conductor to the third conductor; and
   wherein the controller is configured such that the controller does not unlatch the powered latch unless an electrical signal is received indicating that the second and third conductors of the unlatch switch are connected.

* * * * *